United States Patent [19]

Kroehnert

[11] Patent Number: 5,179,260
[45] Date of Patent: Jan. 12, 1993

[54] DEVICE AND PROCESS FOR THE LASER WELDING OF A TUBE

[75] Inventor: Gerhard Kroehnert, Todesfelde, Fed. Rep. of Germany

[73] Assignee: Siemens Aktiengesellschaft, Berlin and Munich, Fed. Rep. of Germany

[21] Appl. No.: 746,436

[22] Filed: Aug. 16, 1991

[30] Foreign Application Priority Data

Aug. 17, 1990 [DE] Fed. Rep. of Germany ... 9011959[U]
May 13, 1991 [DE] Fed. Rep. of Germany ....... 4115562

[51] Int. Cl.$^5$ .............................................. B23K 26/00
[52] U.S. Cl. ........................... 219/121.63; 219/121.74; 219/121.82; 219/121.84
[58] Field of Search ...................... 219/121.63, 121.64, 219/121.82, 121.84, 121.73, 121.74, 121.75; 376/260

[56] References Cited

U.S. PATENT DOCUMENTS

| | | | |
|---|---|---|---|
| 3,383,491 | 5/1968 | Muncheryan | 219/121 |
| 3,440,393 | 4/1969 | Henderson | 219/125 |
| 3,679,863 | 7/1972 | Houldcroft | 219/121 LM |
| 3,749,878 | 7/1973 | Sullivan | 219/121 L |
| 3,821,510 | 6/1974 | Muncheryan | 219/121 L |
| 4,088,865 | 5/1978 | Peters | 219/121 L |
| 4,128,753 | 12/1978 | Sharp | 219/121 L |
| 4,160,894 | 7/1979 | Stemmler | 219/121 L |
| 4,167,662 | 9/1979 | Steen | 219/121 L |
| 4,358,659 | 11/1982 | Spohnheimer | 219/121.62 |
| 4,367,017 | 1/1983 | Jimbou | 350/486 |
| 4,510,372 | 4/1985 | Kobuck | 219/125.11 |
| 4,514,614 | 4/1985 | Stol | 219/125.11 |
| 4,518,843 | 5/1985 | Antol | 219/121 LC |
| 4,561,436 | 12/1985 | Munnerlyn | 219/121.74 X |
| 4,564,736 | 1/1986 | Jones | 219/121 L |
| 4,574,180 | 3/1986 | Kasner | 219/121 LY |
| 4,694,136 | 9/1987 | Kasner | 219/121 LD |
| 4,694,137 | 9/1987 | Hawkins | 219/121 LC |
| 4,724,298 | 2/1988 | Hawkins | 219/121 LU |
| 4,827,098 | 5/1989 | Kasner | 219/121.63 |
| 4,839,495 | 6/1989 | Kitera et al. | 219/121.63 |
| 4,972,062 | 11/1990 | Aharon | 219/121.78 |
| 4,978,834 | 12/1990 | Griffaton | 219/121.63 |
| 4,983,796 | 1/1991 | Griffaton | 219/121.63 |
| 4,997,250 | 3/1991 | Ortiz, Jr. | 219/121.75 X |
| 5,006,268 | 4/1991 | Griffaton | 219/121.63 |

FOREIGN PATENT DOCUMENTS

| | | |
|---|---|---|
| 0300458A1 | 1/1989 | European Pat. Off. . |
| 0364366A2 | 4/1990 | European Pat. Off. . |
| 0367648A1 | 5/1990 | European Pat. Off. . |
| 0408405A1 | 1/1991 | European Pat. Off. . |
| 3910098A1 | 10/1990 | Fed. Rep. of Germany . |
| 55-144391 | 11/1980 | Japan . |
| 56-14090 | 2/1981 | Japan . |
| 56-41091 | 4/1981 | Japan . |
| 56-74393 | 6/1981 | Japan . |
| 56-91992 | 7/1981 | Japan . |
| 57-44486 | 3/1982 | Japan . |
| 57-181789 | 11/1982 | Japan . |
| 59-50986 | 3/1984 | Japan . |
| 59-78791 | 5/1984 | Japan . |
| 59-191585 | 10/1984 | Japan . |
| 60-82284 | 5/1985 | Japan . |
| 60-251222 | 12/1985 | Japan . |
| 61-63387 | 4/1986 | Japan . |
| 62-93094 | 4/1987 | Japan . |

*Primary Examiner*—C. L. Albritton
*Attorney, Agent, or Firm*—Ira Lee Zebrak

[57] ABSTRACT

A process and device for the laser welding of a tube (14) along its inner circumference with a probe (1) that can be inserted in the tube (14) has for the focusing and deflection of a laser beam (57) propagated within the probe (1), mainly along its longitudinal axis (10), at least one optical element (41, 65), which generates a deflected laser beam (59) focused on a focal point (F) lying outside the probe (1), the direction of whose propagation is oriented obliquely relative to the longitudinal axis (10). By this means, both the thermal stress on the deflecting elements (41, 65) mounted within the probe (1) and any precipitation of welding material in the interior of the probe (1) are reduced.

37 Claims, 4 Drawing Sheets

DEVICE AND PROCESS FOR THE LASER WELDING OF A TUBE

CROSS-REFERENCE TO RELATED APPLICATION

This patent application is related to co-pending United States patent application entitled "DEVICE AND PROCESS FOR THE LASER WELDING OF A TUBE", filed on even date herewith, in the name of the same inventor as the present application, and assigned to the same assignee as the present application.

FIELD OF THE INVENTION

The present invention relates to a device and a process for the laser welding of a tube along its inner surface with a probe that can be inserted in the tube.

BACKGROUND INFORMATION

A process for the laser welding of a tube with a probe that can be inserted in the tube is known, for example, from EP-A1-0 300 458. The probe described is connected by means of an optical waveguide with an Nd:YAG solid-body laser. The laser beam that emerges from one end of the optical waveguide within the probe is focused on a focal point located outside the probe by means of a lens system consisting of several lenses and a deflecting mirror. The deflecting mirror is inclined at an angle of 45° to the longitudinal axis of the probe and deflects by 90° the laser beam that is focused by the lens system and extends within the probe between the lens system and the deflecting mirror. The deflected laser beam leaves the probe through a cylindrical outlet opening located radially in the housing of the probe. The laser beam that has been focused on the inner surface of the tube that is to be welded thus impinges directly opposite the outlet opening, in the middle, perpendicularly on the inner surface.

In this familiar device, a significant part of the laser light that impinges on the inner surface of the tube is thus reflected back upon itself and, accordingly, into the interior of the probe. This produces an additional thermal stress on the optical components mounted within the probe. Since the outlet opening for the laser beam is located directly opposite the welding area, welding vapor, welding plasma, or—particularly when a pulsed laser is employed—drops released from the melt may rebound on the deflecting mirror and on the outlet opening, thus considerably reducing the useful life of the probe.

One purpose of the present invention is therefore to provide a device and a process for the laser welding of a tube along its inner surface with a probe that can be inserted in the tube, with which a thermal stress on the optical components mounted in the probe and a precipitation of welding vapor on the deflecting mirror and in the vicinity of the outlet opening can be reduced to a large extent.

SUMMARY OF THE INVENTION

The present invention is directed to a device and a process for laser welding a tube To focus and reflect a laser beam that extends within the probe, primarily along its longitudinal axis, at least one optical element is provided, which generates a laser beam focused on a focal point that is located outside the probe, and is propagated in a direction that runs obliquely relative to the longitudinal axis of the probe. As a result, any backward reflection of the laser beam impinging on the welding point into the interior of the probe is, for practical purposes, avoided. The optical elements include optical components with which the direction of propagation of a laser beam can be altered, for example, plane mirrors, concave mirrors or lenses. After reflection, the laser beam reflected from the inner surface of the tube impinges solely on the outer sheathing of the probe, which is less sensitive to thermal stresses. In addition, because of the oblique release of the deflected laser beam, there is no need for the outlet opening to be directly opposite the welding area, so that the precipitation of welding vapor in the area of the outlet opening and on the optical elements is reduced.

In a preferred embodiment of the present invention, an optical element is provided that generates a laser beam that is deflected obliquely forward toward the head of the probe.

The angle formed by the deflected laser beam and the longitudinal axis of the probe is preferably within the range of approximately 60° to 80°. By this means, it is ensured that even when there is a large outlet opening for the laser beam, any reflection of the laser beam back into the interior of the probe is avoided for all practical purposes.

In one design of the present invention, a deflecting mirror with a substantially flat reflecting surface is provided in the probe to deflect the focused laser beam. The normal to the reflecting surface forms an angle with the longitudinal axis of the probe that is greater than 45° and preferably within the range of approximately 50° to 60°.

In a preferred embodiment of the present invention, a concave deflecting mirror is provided, which is designed both to focus and to deflect the laser beam that extends in the middle along the longitudinal axis of the probe. By this means, the cross section of the laser beam that impinges on the deflecting mirror is larger than in the embodiment with the flat deflecting mirror. The radiation impinging on each surface unit of the deflecting mirror is thereby reduced and, consequently, so is the local heating of the deflecting mirror.

In another preferred embodiment of the present invention, to improve the imaging properties of the optical system when a probe connected optically to a laser by means of a waveguide is used, there are provided, between the end of the optical waveguide and the concave deflecting mirror, devices to collimate the laser beam emerging from the optical waveguide.

The deflecting mirror is preferably made of a material with high heat conductivity, such as copper (Cu). By this means, the thermal stress on the deflecting mirror is further reduced and the durability of the reflective coating is, accordingly, further increased.

In a preferred embodiment of the present invention, to release the deflected laser beam from the probe, an outlet opening is provided, which provides an axially directed flow component to a protective stream of shield gas that flows out of the outlet opening.

In another design of the present invention, any precipitation of vaporized welding material on the deflecting mirror is further reduced by providing devices with which a partial stream of gas is divided from a protective stream of shield gas extending within the probe and is conducted through channels located within the probe. Preferably, the channels open into a recess in the deflecting mirror, which is located directly opposite the outlet opening.

In another advantageous version of the present invention, flow channels are also provided in the probe, by means of which a part of the protective gas flowing within the probe in the direction of the deflecting mirror is divided off before it reaches the deflecting mirror and conducted with an axial flow component to the outer surface of the probe. By this means, there is produced between the probe and the tube an axially directed protective gas stream which further reduces the precipitation of welding vapor on the probe and the deflecting mirror. In a preferred embodiment of the present invention, devices are provided to adjust the quantitative ratio between the two streams of gas.

In a process of the present invention for the laser welding of a tube along its inner surface with a probe that can be introduced into the tube, a laser beam that is propagated within the probe, mainly along its longitudinal axis, is deflected obliquely relative to the longitudinal axis of the probe and focused on a point on the inner surface of the tube.

Preferably, a protective stream of shield gas is trained on the welding area, which has an axial flow component directed away from an outlet opening for the deflected and focused laser beam.

In another preferred design of the process of the present invention, part of the protective gas flowing within the probe to the outlet opening is divided off before it reaches the outlet opening and conducted with an axial flow component into the space located between the tube and the probe.

An additional reduction of the precipitation of welding material on the deflecting mirror is achieved by the fact that from the protective gas flowing within the probe to the outlet opening, there is divided off, within the probe at the outlet opening, another partial stream of gas with an axially directed flow component.

In another advantageous embodiment of the process of the present invention, a solid-state laser operating in the cw mode is used, thus preventing any release of drops from the welding melt.

BRIEF DESCRIPTION OF THE DRAWINGS

For a more detailed explanation of the present invention, reference is made to the embodiments in the drawings.

DETAILED DESCRIPTION

Figure 1:
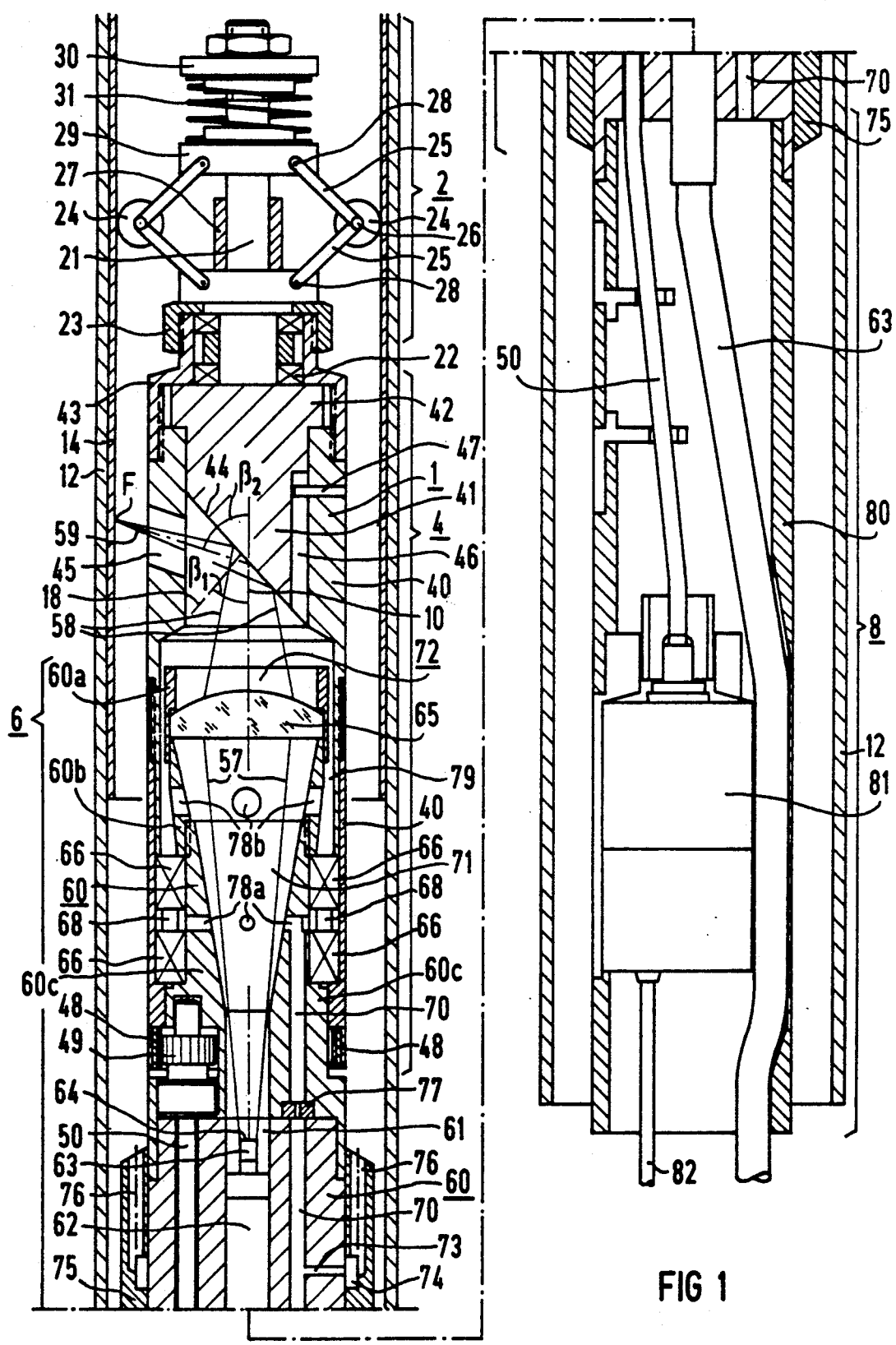
In FIG. 1, there is shown a longitudinal section of a probe according to the present invention which has been inserted in a tube.

According to FIG. 1, a probe 1 in accordance with one embodiment of the present invention comprises a centering unit 2, a deflecting unit 4, a focusing unit 6 and a drive unit 8, which are arranged one after the other along a longitudinal axis 10 of the probe 1. The probe 1 is inserted in the tube 12 that is to be processed and extends with its head, which includes the deflecting unit 4, into the interior of a sleeve tube 14 that is inserted in the tube 12 and is to be welded to the tube 12.

The centering unit 2 comprises a shaft 21, which is mounted on the head end of the probe 1 on ball bearings 22 so that it can rotate on the deflecting unit 4 and is held fast in the axial direction with a screw cap 23. The centering unit 2 contains at least three rolls 24, of which only two are shown in FIG. 1, and each of which is spring-mounted on a swivel gearing with two elements 25. The two elements 25 form the legs of an isosceles triangle and touch one another in a swivel joint 26 that receives the roll 24. The two elements 25 are likewise mounted with freedom to move on the shaft 21 by means of swivel joints 28. One of the two swivel joints 28 interlocks rigidly with a movable flange 29, which surrounds the shaft 21. At the free end of the shaft 21 is fastened another flange 30. Between the flange 29 and the flange 30 is mounted a spiral spring 31, so that any radial inward movement of the roll 26 is countered by the action of the spiral spring 31. A spacing sleeve 27 is mounted on the shaft 21 to prevent the swivel joint 26 from closing and to facilitate the insertion of the probe 1 into the tube 12.

The deflecting unit 4 comprises a cylindrical housing 40, in which there is mounted a deflecting mirror 41. The deflecting mirror 41 consists of heavy cylindrical copper block, which has on the end facing the centering unit 2 a flange-like extension 42, which is used to fix the deflecting mirror 41 in an axial position by means of a screw cap 43. The copper block has on the end opposite the flange-like extension 42 a front surface that is mounted obliquely relative to its longitudinal axis. This front surface is coated with a reflecting layer and forms a mirror surface 44. The reflecting layer can be a dielectric coating, preferably titanium nitride (TiN), or a metallic coating, preferably vapor-deposited gold (Au). In addition, the reflecting layer can be provided with a protective layer made of quartz.

The mirror surface 44 is arranged within the probe 1 in such a manner that its normal 18 forms an angle $\beta_1$ with the longitudinal axis 10 of the probe that is greater than 45° and preferably within the range of approximately 50° to 60°. A laser beam 58 that is propagated in the middle along the longitudinal axis 10 and impinges on the mirror surface 44 is thus deflected obliquely in a forward direction. The central ray 59 of the laser beam emerges from the housing 40 through an outlet opening 45 at an angle $\beta_2$, which is preferably within the range of approximately 60° to 80° with respect to the longitudinal axis 10. In the example of the present invention shown in FIG. 1, a hole that likewise runs obliquely relative to the longitudinal axis 10 is provided as the outlet opening 45.

The deflecting mirror 41 is also prevented from rotating within the housing 40 by a groove 46 running parallel to its longitudinal axis 10 and a pin 47 that fits into the groove 46.

The use of a heavy copper block as a deflecting mirror 41 reduces the heating of the mirror surface 44 by the laser beam 58 and extends the useful life of the reflective coating.

The housing 40 of the deflecting unit 4 is provided at the end opposite to the reflecting mirror 41 with a toothed ring 48 on its inner surface, with which there meshes a pinion 49 driven by the drive unit 8. The pinion 49 is torque-set to a flexible shaft 50, which is coupled to the drive shaft of an electric motor 81 mounted in the drive unit 8 By means of the pinion 49 that is driven by the electric motor 81, the housing 40 is put into rotation, so that the focal point F, at which the emerging laser beam 59 impinges on the inner surface of the sleeve tube 14 that is to be welded, is moved along the circumference of the sleeve tube defining a substantially circular path.

Between the deflecting unit 4 and the drive unit 8 is located the focusing unit 6, whose housing 60 is rigidly connected to the housing 80 of the drive unit 8. The housing 60 contains a central hole 61, into which is inserted, on the side facing the drive unit 8, a sleeve 62 to receive an optical waveguide 63. The free end of the optical waveguide 63 terminates in the hole 61 and is centered axially by the sleeve 62. The other end of the optical waveguide 63 is coupled to a laser (not shown in the drawing), preferably a solid-state laser, such as an Nd:YAG solid-state laser.

In one embodiment of the present invention, at the end of the focusing unit 6 that faces the deflecting mirror 41, there is mounted a focusing element, such as a lens 65 or a lens system, which focuses a divergent laser beam 57 which emerges from the end 64 of the optical waveguide 63. The position of the focal point F of the laser beam 59 can be adjusted by changing the distance between the end 64 of the optical waveguide and the lens 65.

The housing 40 surrounds the housing 60 in the vicinity of the lens 65 and is mounted with freedom to rotate on the housing 60 with ball bearings 66 and spacing sleeves 68 so that the housing 40 interlocks axially with the housing 60 in a rigid manner. Thus, when the pinion 49 is rotated, only the housing 40 that carries the deflecting unit 41 is put into rotation. The lens 65 and the optical waveguide 63 do not take part in this rotation.

The lens 65 is supported by several rigidly interlocking, non-rotating housing elements 60a, 60b and 60c, which extend into the interior of the housing 40. The housing elements 60b and 60c form an approximately V-shaped space 71, which is coupled in fluid communication through holes 78a with a flow channel 70 located in housing element 60c. The flow channel 70 conducts a protective shield gas, for example argon, into the space 71 located between the lens 65 and the free end 64 of the optical waveguide 63. In the flow channel 70 is inserted a reducing nozzle 77 to narrow the cross section of the channel. The shield gas flowing in the flow channel 70 above the reducing nozzle 77 enters the space 71 through the holes 78a, leaves the space 71 through additional holes 78b in housing element 60b, exits into a ring channel 79, and from there arrives in the space 72 between the lens 65 and the deflecting mirror 41.

The shield gas, which in this manner flows around the lens 65 and past the deflecting mirror 41, leaves the probe through the outlet opening 45. By this means, not only is the welding area ventilated with shield gas, but in addition, the deflecting elements that are struck by the laser beams 57 and 58 are cooled. Furthermore, due to the outward orientation of the stream of shield gas, any precipitation of welding vapor on the deflecting mirror is prevented.

The outlet opening 45 is formed, in the example of the present invention shown in the figures, by a hole directed obliquely forward in the wall of the housing 40. By this means, the shield gas flowing through the outlet opening 45 obtains in addition an axial flow component, which helps to remove the welding vapor from the vicinity of the outlet opening 45.

The flow channel 70 is also coupled in fluid communication with a radially branching flow channel 73, which opens into a circular groove 74 of a sleeve 75 that surrounds the housing 60. The sleeve 75 forms a cylindrical extension of the probe 1. Parallel to the longitudinal axis of the probe 1, the sleeve 75 is provided with several holes 76 which are coupled in fluid communication with the circular groove 74. Through the transverse channel 73, a radial gas stream is divided off from the stream of shield gas that leaves the drive unit 8 and enters the flow channel 70. This partial stream is deflected in an axial direction into the circular groove 74 and, at the front surface of the sleeve 75, which faces the deflecting unit 4, it exits into the channel located between the tube 12 and the outer sheathing of the probe 1. This ensures that an effective atmosphere of protective gas is maintained in the vicinity of the welding area. In addition, the welding vapor that is generated during the melting is effectively conducted away from the welding point as a result of the axial flow, and the risk that welding vapor will be precipitated in the interior of the probe 1 is reduced.

To adjust the quantitative ratio between the stream of protective gas that flows within the probe 1 toward the deflecting mirror 41 and the stream of protective gas that is conducted radially outward, a reducing nozzle 77 inserted in the flow channel 70 is provided.

The housing 80 of the drive unit 8 is adapted to receive a slip-on hose (not shown in the drawings), for example, on the end opposite to the focusing unit 6 through which the protective gas is transported to the probe and which receives the optical waveguide 63 and the lines 82 that are required to supply electricity to the electric motor 81.

Figure 2:
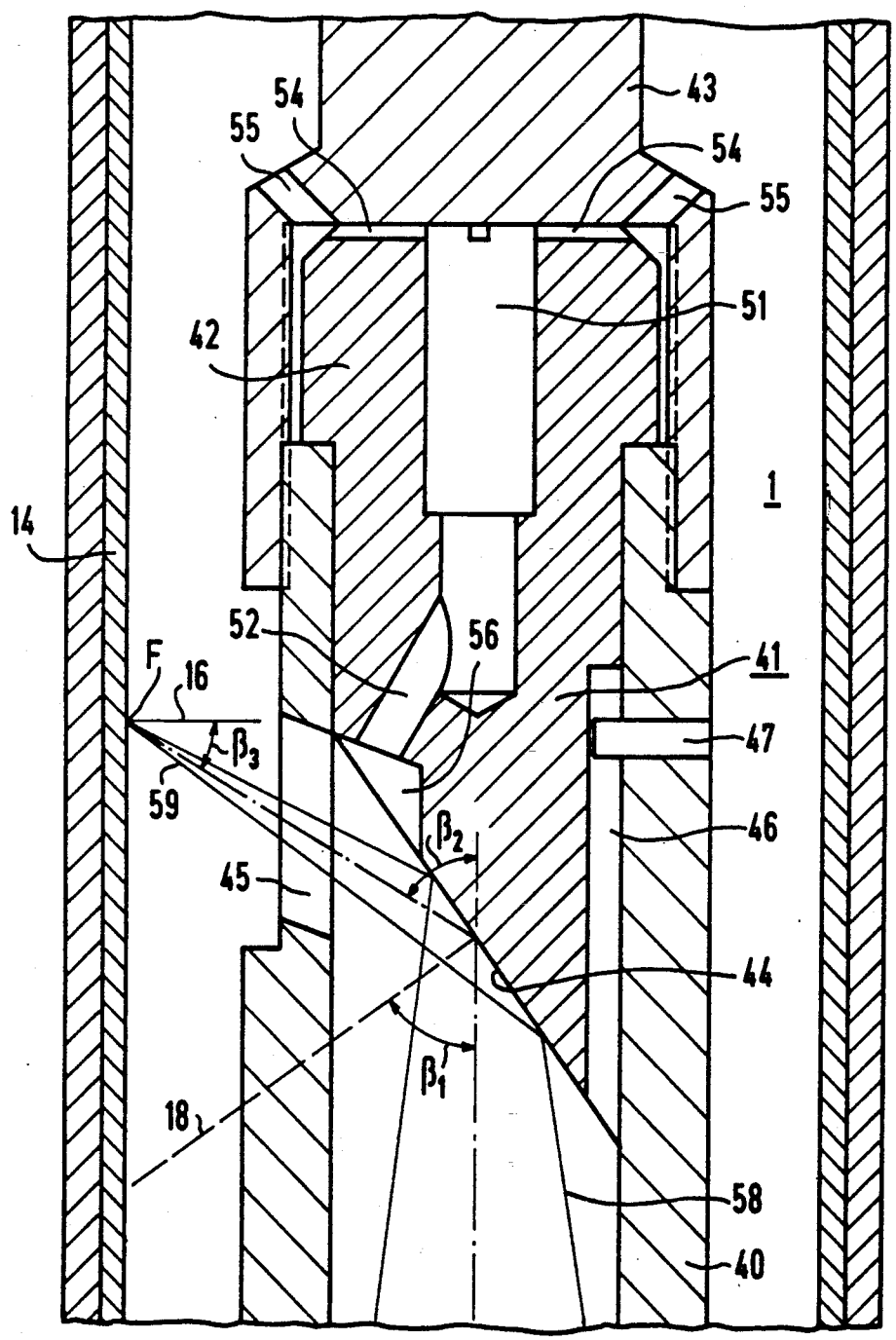
FIGS. 2, 3 and 4 each provide an enlarged section of advantageous embodiments of the probe of the present invention in the vicinity of the deflection device.

In the embodiment of the present invention according to FIG. 2, a deflecting mirror 41 is provided with a central hole 51, which leads from the flange-like extension 42 into the interior of the deflecting mirror 41 and is connected through a hole 52 that runs obliquely outwards and emerges in a recess 56 in the mirror surface 44 in the vicinity of the outlet opening 45. The flange-like extension 42 is provided on its front surface, which faces the swivel unit 43, with several radial groves 54. The radial grooves 54 form a connection between the central hole 51 and holes 55 which run obliquely outward within the swivel nut 43.

The stream of shield gas that flows along the deflecting mirror 41 within the housing 40 is thus split once again before it leaves the housing through the outlet opening 45. A partial stream of gas arrives through the hole 52 and the hole 51 of the deflecting mirror 41 and exits from the probe 1 through the holes 55 in the swivel nut 43. As a result of this stream of gas in the interior of the deflecting mirror 41, the cooling of the deflecting mirror 41 is improved and its useful life is increased.

The outlet opening 45 and the recess 56 are directly connected with one another, so that there can be no dead space that is not covered by the flow of shield gas. Dead spaces of this kind between the deflecting mirror 41 and the wall of the housing in which the outlet opening 45 is located would, in fact, lead to turbulence and thus an increase in the precipitation of welding material on the reflecting surface 44.

It may also be seen from FIG. 2 that the laser beam 59 emerging from the probe 1 hits the focal point F obliquely relative to the inner surface of the tube 14. Between the normal extending from the focal point F to the inner surface of the tube 14 and the central ray of the emerging laser beam 59 an angle $\beta_3$ is formed, as shown in FIG. 2, which is preferably between approximately 10° and 30°.

Figure 3:
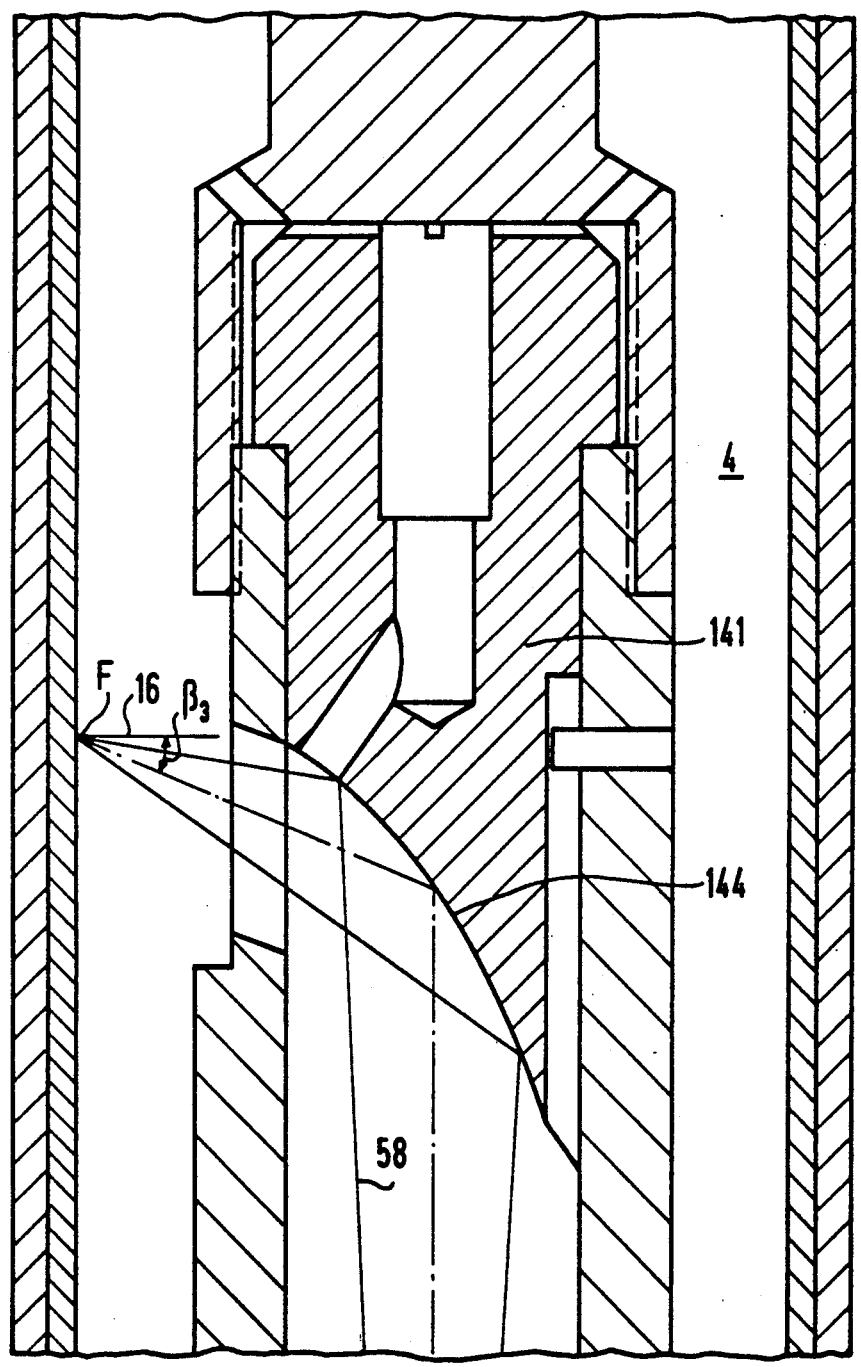

It should be pointed out that several means for focusing and for deflecting the laser beam which perform the functions of focusing and deflecting in substantially different ways in comparison to each other can be employed in the device and process of the present invention. Accordingly, in the embodiment of the present invention according to FIG. 3, there is provided in the deflecting unit 4 a deflecting mirror 141, whose reflecting surface 144 is concave. In this embodiment of the present invention, rather than initially focus the diverging laser beam with a lens and then deflect the laser beam with a flat mirror, as in the embodiments described above in relation to FIGS. 1 and 2, the concave reflecting surface 144 simultaneously focuses and reflects the laser beam onto the surface of the sleeve tube 14 to be welded. The deflecting mirror 141 therefore serves both to deflect the laser beam 58 that is propagated within the probe 1 and to focus this laser beam 58 on a focal point F lying outside the probe. As shown in FIG. 3, the laser beam is simultaneously focused and deflected obliquely forward relative to the longitudinal axis 10 of the probe. The normal 16 to the focal point F thus forms an angle $\beta_3$ relative to the central ray of the laser beam, which is preferably between approximately 10° and 30°.

Thus, one advantage of this embodiment of the present invention, is that a lens arrangement to focus the laser beam emerging from the optical waveguide is no longer necessary. Another advantage is that the cross-sectional area of the laser beam impinging on the deflecting mirror is typically increased in comparison to the embodiments described above employing a flat deflecting mirror. As a result, the radiation intensity impinging on the deflecting mirror per unit area of the mirror surface is reduced and, accordingly, the local heating of the deflecting mirror is correspondingly reduced.

Figure 4:
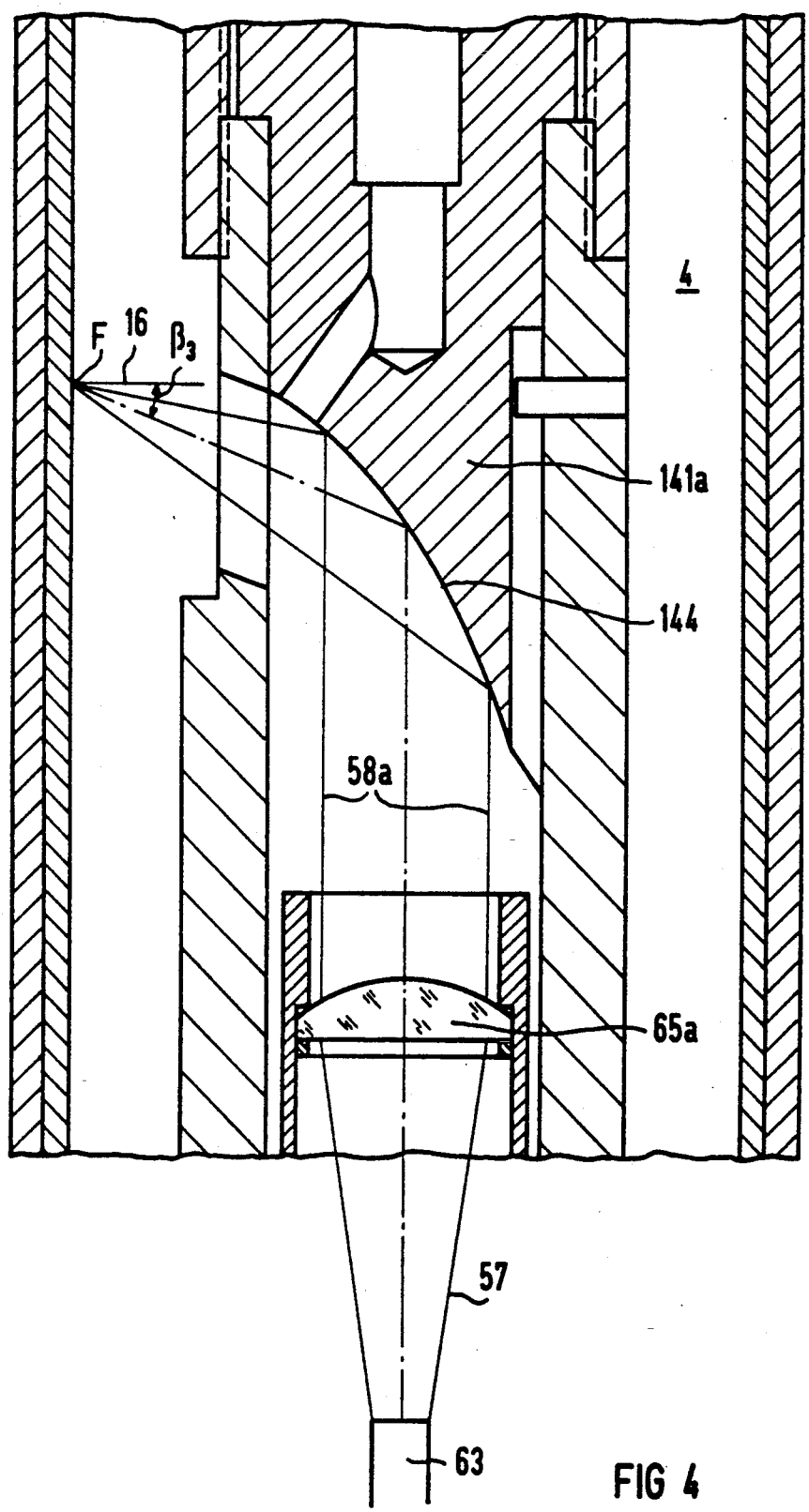

As shown in FIG. 4, a collimator lens 65a can be mounted in front of a concave deflecting mirror 141a in accordance with another embodiment of the present invention. The collimator lens 65a collimates a diverging laser beam 57 emerging from the optical waveguide 63, to a parallel laser beam 58a, which is then focused and deflected by the deflecting mirror 141a into a focal point F on the surface of the sleeve tube 14. The collimator lens 65a permits a greater distance between the optical waveguide 63 and the deflecting mirror 141a, while maintaining the same distance from the focal point F to the deflecting mirror 141a.

Thus, as will be recognized by those skilled in the art, although the embodiments of FIGS. 1 and 2, which employ a flat mirror surface and a focusing lens, perform the function of focusing and deflecting the laser beam in a substantially different way in comparison to the embodiments of FIGS. 3 and 4, which employ a concave mirror to simultaneously focus and deflect the laser beam, both systems can be used in the device and process of the present invention.

I claim:

1. A device for laser welding a tube, comprising:
a welding unit for insertion into the tube and including at least one deflecting member for deflecting a laser beam transmitted substantially in the direction of a longitudinal axis of the welding unit at an oblique angle relative to the longitudinal axis and onto a focal point located outside of the probe for welding the tube.

2. A device as defined in claim 1, wherein the angle is within the range of approximately 60° to 80°.

3. A device as defined in claim 1, further comprising a focusing unit including at least one lens for focusing the laser beam, and wherein the deflecting member includes a substantially flat deflecting surface for deflecting the laser beam focused by the lens onto the surface of the tube.

4. A device as defined in claim 3, wherein the normal to the substantially flat deflecting surface forms an angle with the longitudinal axis of the welding unit which is greater than 45°.

5. A device as defined in claim 4, wherein the angle is between approximately 50° and 60°.

6. A device as defined in claim 1, wherein the deflecting member includes a curved deflecting surface for both focusing and deflecting the laser beam.

7. A device as defined in claim 6, wherein the curved deflecting surface is substantially concave shaped.

8. A device as defined in claim 6, further comprising means for collimating the laser beam into a substantially parallel beam prior to the focusing and deflection of the beam by the curved deflecting surface.

9. A device as defined in claim 8, wherein the means for collimating includes at least one collimator lens.

10. A device as defined in claim 1, wherein the deflecting member includes a deflecting surface made of a material with high heat conductivity.

11. A device as defined in claim 10, wherein the deflecting surface includes a coating of gold vapor-deposited on the surface.

12. A device as defined in claim 1, wherein the welding unit defines an outlet opening for permitting the deflected laser beam to be transmitted through the outlet opening and onto the surface of the tube to be welded, and further includes first means mounted within the welding unit for transmitting a first stream of gas to the outlet opening so that the gas flows out of the welding unit through the outlet opening.

13. A device as defined in claim 12, further comprising second means for transmitting a second stream of gas between the welding unit and the tube so that the second stream of gas flows between the welding unit and the tube in the vicinity of the outlet opening.

14. A device as defined in claim 12, further comprising third means for directing a portion of the first stream of gas into a third stream of gas prior to entry of the first stream of gas through the outlet opening for directing the third stream of gas between the welding unit and the tube downstream of the outlet opening.

15. A device as defined in claim 14, wherein the third means includes at least one flow channel formed within the welding unit adjacent to the deflecting member for directing the third stream through the flow channel to cool the deflecting member.

16. A device as defined in claim 15, wherein the third means further includes a recess formed within the deflecting member and located substantially opposite the outlet opening, the recess being coupled in fluid communication with the flow channel for directing the third stream through the recess into the flow channel.

17. A device as defined in claim 13, further including fourth means for adjusting the quantitative ratio of the first and second streams of gas.

18. A device as defined in claim 17, wherein the fourth means includes a reducing nozzle for receiving the first stream of gas and controlling the flow rate of the first stream of gas.

19. A device as defined in claim 13, wherein the second means includes a sleeve member coupled to the welding unit and defining a flow channel for receiving the second stream of gas to direct the second stream of gas between the welding unit and the tube.

20. A device as defined in claim 19, wherein the sleeve member defines at least one aperture coupled in fluid communication with the flow channel for directing the second stream of gas through the aperture and between the welding unit and the tube substantially in the direction of the outlet opening.

21. A device as defined in claim 13, wherein the second means transmits the second stream of gas upstream of the outlet opening.

22. A device as defined in claim 13, wherein the first and second streams of gas are divided from a common stream of gas flowing into the welding unit.

23. A process for laser welding a tube, comprising the steps of:
inserting a welding unit into the tube;
transmitting a laser beam within the welding unit in a direction substantially parallel to the longitudinal axis of the welding unit; and
deflecting the laser beam at an oblique angle relative to the longitudinal axis of the welding unit onto a surface of the tube to weld the tube.

24. A process as defined in claim 23, wherein the welding unit defines an outlet opening for permitting the deflected laser beam to pass through the outlet opening and onto the surface of the tube, and including the additional step of directing a first stream of gas through the outlet opening of the welding unit.

25. A process as defined in claim 24, comprising the additional step of directing a second stream of gas into the space between the tube and the welding unit.

26. A process as defined in claim 25, comprising the additional steps of directing a common stream of gas into the welding unit and separating the common stream of gas into the first and second streams.

27. A process as defined in claim 25, comprising the additional steps of dividing the first stream of gas into a third stream of gas and directing the third stream of gas in substantially the direction of the longitudinal axis of the welding unit downstream of the outlet opening of the welding unit.

28. A process as defined in claim 27, wherein the third stream of gas is further directed out of the welding unit and into the space between the tube and the welding unit.

29. A process as defined in claim 23, wherein the oblique angle is within the range of approximately 60° to 80°.

30. A process as defined in claim 23, wherein the laser beam is generated by a solid-state laser operating in the cw mode.

31. A process as defined in claim 23, wherein the laser beam is both focused and deflected by a curved deflecting surface within the welding unit.

32. A process as defined in claim 31, wherein the curved deflecting surface is substantially concave shaped.

33. A process as defined in claim 31, comprising the additional step of collimating the laser beam into a substantially parallel beam prior to the focusing and deflection of the laser beam.

34. A process as defined in claim 33, wherein a collimating lens is used to collimate the laser beam within the welding unit.

35. A process as defined in claim 23, wherein the laser beam is initially focused and then the focused laser beam is deflected onto the surface of the tube.

36. A process as defined in claim 35, wherein the laser beam is focused by a focusing lens within the welding unit, and then deflected through an outlet opening formed within the welding unit by a substantially flat deflecting surface onto the surface of the tube to be welded.

37. A process as defined in claim 23, comprising the additional step of inserting a sleeve tube within the tube and welding the sleeve tube to the tube to repair weld the tube.

* * * * *